United States Patent

Merino Gonzalez et al.

[11] Patent Number: 5,570,377
[45] Date of Patent: Oct. 29, 1996

[54] METHOD AND DEVICE FOR DETECTION AND CORRECTION OF ERRORS IN ATM CELL HEADERS

[75] Inventors: Jose L. Merino Gonzalez, Castillas-Arroyo de Valdemoro; Carmen maria L. Cabello, deceased, late of Santander, both of Spain, by Manuel Lequerica Toda and Maria Antonia Cabello Martinez, heirs

[73] Assignee: Alcatel N.V., Amsterdam, Netherlands

[21] Appl. No.: 158,609

[22] Filed: Nov. 29, 1993

[30] Foreign Application Priority Data

Nov. 30, 1992 [ES] Spain .................................. P9202433

[51] Int. Cl.$^6$ ................................................ H03M 13/00
[52] U.S. Cl. ...................... 371/37.1; 371/37.4; 371/37.7
[58] Field of Search .............................. 371/37.1, 38.1, 371/39.1, 37.5, 37.4, 37.7; 370/94.1, 94.2

[56] References Cited

U.S. PATENT DOCUMENTS

| | | | |
|---|---|---|---|
| 3,656,107 | 4/1972 | Hisiao et al. | 340/146.1 |
| 4,416,010 | 11/1983 | Hibino et al. | 371/37 |
| 5,119,368 | 6/1992 | Hiltner et al. | 370/58.1 |
| 5,155,487 | 10/1992 | Tanaka et al. | 341/100 |
| 5,230,002 | 7/1993 | Yamashita et al. | 371/37.1 |
| 5,285,446 | 2/1994 | Yonehara | 370/60.1 |
| 5,345,451 | 9/1994 | Uriu et al. | 371/42 |
| 5,383,203 | 1/1995 | Miyazono | 371/37.7 X |
| 5,402,429 | 3/1995 | Stessens | 371/37.1 |

FOREIGN PATENT DOCUMENTS 0472149 2/1992 European Pat. Off. .
0473188 3/1992 European Pat. Off. .

OTHER PUBLICATIONS

"Error–Correcting Codes", W. Wesley Peterson, *The M.I.T. Press and J. Wiley & Sons, Inc., New York and London*, 1961, pp. 201–204.

"Patent Abstracts of Japan, Unexamined Applications", E. Field, *The Patent Office Japanese Government*, vol. 16, No. 18, Jan. 17, 1992, p. 19 E 1155, and JP–A–03–235 441.

"Error Correcting Codes" by W. W. Peterson, published by the Massachusetts Institute of Technology and John Wiley & Sons, Inc., New York and London, 1961. pp. 201–204.

*Primary Examiner*—Roy N. Envall, Jr.
*Assistant Examiner*—Brian C. Oakes
*Attorney, Agent, or Firm*—Ware, Fressola, Van Der Sluys & Adolphson

[57] ABSTRACT

A method and device for detection and correction of errors in ATM cell headers, wherein it series to parallel converts (2) the serial data stream (1), thereby obtaining a parallel data format of n bits, the clock rate of which is n times lower than the original. From the parallel input data of the ATM header, a syndrome word (3) is generated according to a determined function that indicates that no error has been detected, that more than one error has been detected, or which bit has to be corrected when only one error has been detected. The ATM cell headers are delayed (4) until the syndrome word has been completed, the error correction process (5) then being carried out, when required, in accordance with the syndrome word generated. In addition, an individual indication (7) for external use is generated of the result of the detection and possible correction process made. The device implements the method described.

9 Claims, 3 Drawing Sheets

METHOD AND DEVICE FOR DETECTION AND CORRECTION OF ERRORS IN ATM CELL HEADERS

TECHNICAL FIELD

This invention refers to a method and a device for detection and correction of errors in ATM (Asynchronous Transfer Mode) cell headers, in which a conversion is made from series to parallel of the n bits in the serial data stream, a n-bit parallel data format being obtained which has a clock rate n times lower than that of the original.

The invention is for application in digital communications systems.

BACKGROUND OF THE INVENTION

In this type of system it is common to add a few extra bits in the so-called cell header in order to protect the information it contains. In the case of CCITT Recommendations G.707, G.708 and G.709, a fifth byte of redundant information is added to the four initial bytes in the ATM cell header. This fifth byte is termed the protection byte and is produced by means of a cyclic coding with a cyclic code (40, 32) generated by the polynomial $g(X)=X^8+X^2+X+1$.

To extract the error-free initial information, these cyclic codes have to be decoded. One of the decoding methods for cyclic codes is that described in the book "Error Correcting Codes" by W. W. Peterson, published by the Massachusetts Institute of Technology and John Wiley & Sons, Inc., New York and London, 1961, pages 201–204.

The method consists in applying the coded data vector to a divider circuit based on a Meggit Decoder with serial data input and, simultaneously, to a storage register.

The divider circuit, which includes a shift register, calculates the so-called "snydrome", such that there is a one-on-one correspondence between this syndrome and the error pattern that is assumed to have occurred. The combinational logic circuit, that is connected to the outputs of the shift register, is designed to have a "1" at its output if, and only if, the syndrome obtained from the divider circuit corresponds to an error pattern with an error in the next bit to leave the storage register.

The storage register must first contain an initial value for a correct decoding, which for this particular case, is all registers set to "0", corresponding also to the initial value of the shift register in the polynomial generator used by the CCITT Recommendations mentioned earlier.

The output of the divider circuit can be expressed in matrixial form as:

$$S_{ts+1}=T \cdot S_{ts}+U_{ts},$$

where $S_{ts}$ is the output of the codes vector from the shift register in the divider circuit, at the time ts, $S_{ts+1}$ is the output of the codes vector at the time ts+1, T is a square matrix that represents the codes transformation of the serial divider circuit (transformation matrix), and $U_{ts}$ is the input vector to the shift register at the time ts.

This systematic method works at the same rate as the binary data rate and produces, at its output, the syndrome corresponding to the current input.

The main drawback of this type of method that works in series, in addition to the limitation in the type of integration technology to be used with present-day communications systems which work at increasingly faster speeds, is that the power consumption of devices working in series, whether at current speeds or at speeds foreseen for the near future, can reach levels that are unacceptable in practice.

TECHNICAL PROBLEM TO BE OVERCOME

Consequently the technical problem to be overcome consists in reducing the total power consumption or, what is the same thing, lowering the working frequency of the digital circuits that perform the error detection and correction function in ATM cell headers.

SUMMARY OF THE INVENTION

To overcome the aforementioned drawbacks, this invention is characterised in that it performs the generation of a syndrome word from the parallel input data in the ATM cell header in accordance with the functional relation:

$$S_{tp+1}=T^n \cdot S_{tp}+U_{tp},$$

where $T^n$ is the n-th power of the serial transformation matrix;

$U_{tp}$ is the n-bit input data vector at time tp;

$S_{tp}$ is the syndrome word at time tp; and $S_{tp+1}$ is the syndrome word at time tp+1;

and in that the syndrome word generated indicates, for the header of each ATM cell with n-bit parallel format:

that no error has been detected; or that more than one error has been detected; or the erroneous bit to be corrected when only one error has been detected.

The method described here is also characterised in that the ATM cell headers with a n-bit parallel format are delayed until the syndrome word is completed, the error correction process then being carried out in accordance with the syndrome word generated.

Optionally, an individual indication for external use can be produced showing that no error has been detected, that more than one error has been detected, or that an error has been corrected.

A device is disclosed that implements the method.

With the aforementioned method and device, significant advantages are obtained such as the possibility of using cheaper technologies when the serial data rate is very high (e.g. CMOS instead of ECL), or simply a reduction in power consumption because of the lower working frequency.

BRIEF DESCRIPTION OF THE FIGURES

A more detailed explanation of the invention is given in the following description based on the attached figures, in which.

BEST MODE FOR CARRYING OUT THE INVENTION

Figure 1:
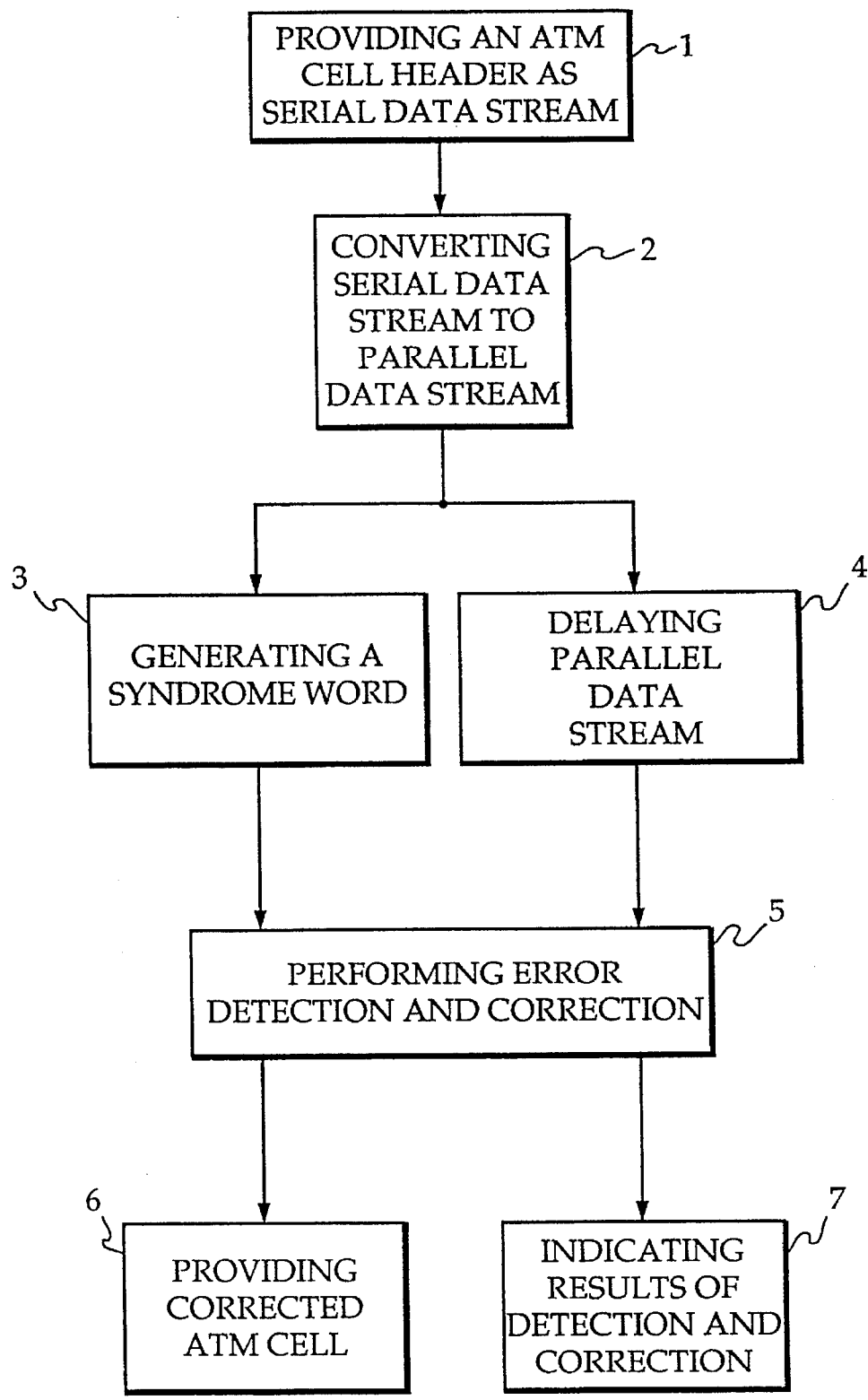
FIG. 1 shows a flowchart of the method used in the invention.

The flowchart in FIG. 1 illustrates the steps in the method used in the invention. The information is received as a serial data stream that forms the ATM cells.

The ATM cell, consisting of a serial data stream 1, is changed to a n-bit parallel data format by means of a series to parallel conversion 2. After this, a syndrome word 3 is generated from the n-bit parallel data format of the ATM cell header. The relation between the syndrome word generated and the parallel input data is described later for the case of using eight bits but can be generalised for any value of n.

When the entire ATM cell header has passed through the syndrome generator, the word obtained indicates that no error has occurred, that more than one error has occurred, or the position of the erroneous bit to be corrected when only one error has occurred. In addition, the ATM cell with a n-bit parallel data format is delayed 4 until the syndrome word is available and an error correction 5 can be performed, when required, taking into account the above syndrome word.

As a result, the corrected ATM cell header is obtained 6, when required, in accordance with the syndrome word. Also, an individual indication 7 to the exterior can be generated from the result of the detection and correction process carried out.

Figure 2:
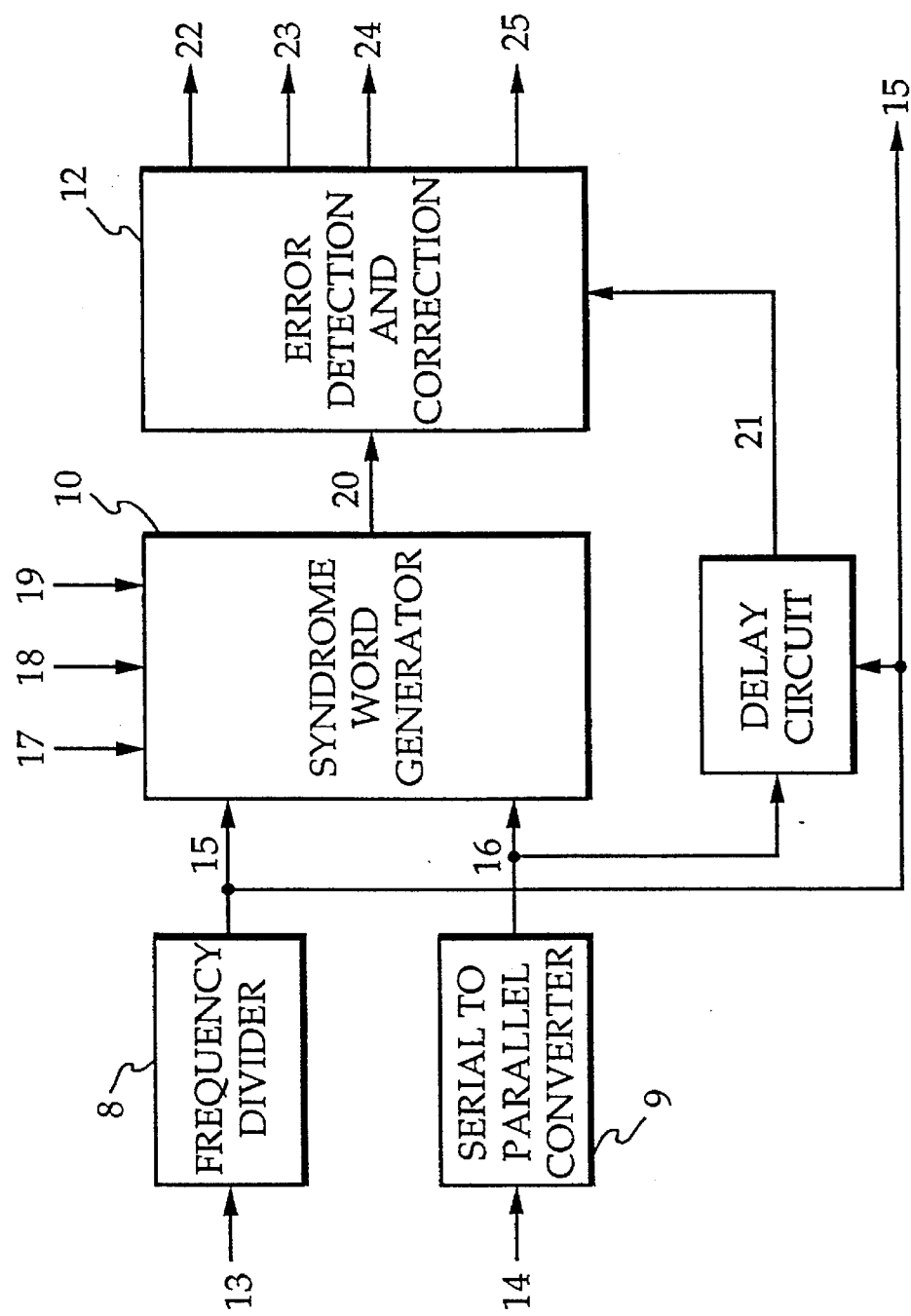
FIG. 2 shows the block diagram of a device that implements the invention.

The block diagram of FIG. 2 shows the device that implements this invention, in which a n-bit parallel data bus 16 is obtained from the ATM cell header with a serial data format 14 by means of a series to parallel converter 9, the parallel data signalling rate being n times lower than the serial data stream 14.

The serial data clock 13 is also divided by n in a frequency divider 8, a parallel data clock 15 being obtained is the working frequency for all subsequent digital circuits in the device.

The device has means 10 to generate a syndrome word 20. This means 10 also receives the parallel data clock 15, the n-bit parallel data bus 16, an initialisation signal 17 to set the initial values of the means 10, an ATM cell header indication signal 18 to indicate the ATM cell bits from which the syndrome word 20 has to be calculated, and an indication signal of the last eight bits in the ATM cell header 19, to indicate the inversion 27 of those bits that were previously inverted in the transmission part.

The means 10 to generate a syndrome word 20 in the specific case where n=8, is based on applying the serial data stream 14 mathematically, eight times consecutively, to a divider circuit defined by the polynomial $g(X)=X^8+X^2+X+1$, the transformation matrix of which is:

$$T(8 \times 8) = \begin{vmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 1 & 0 & 0 & 0 & 0 & 0 & 1 & 0 \\ 1 & 0 & 0 & 0 & 0 & 0 & 0 & 1 \\ 1 & 0 & 0 & 0 & 0 & 0 & 0 & 0 \end{vmatrix}$$

Mathematically it can be probed that the above operation is equivalent to a divider circuit for eight input bits, where the transformation matrix is given by the following expression:

$$T^8(8 \times 8) = \begin{vmatrix} 1 & 1 & 1 & 0 & 0 & 0 & 0 & 0 \\ 0 & 1 & 1 & 1 & 0 & 0 & 0 & 0 \\ 0 & 0 & 1 & 1 & 1 & 0 & 0 & 0 \\ 0 & 0 & 0 & 1 & 1 & 1 & 0 & 0 \\ 1 & 0 & 0 & 0 & 1 & 1 & 1 & 0 \\ 0 & 1 & 0 & 0 & 0 & 1 & 1 & 1 \\ 0 & 1 & 0 & 0 & 0 & 0 & 1 & 1 \\ 1 & 1 & 0 & 0 & 0 & 0 & 0 & 1 \end{vmatrix}$$

and the output of this divider circuit can be expressed in matrixial form as:

$$S_{tp+1} = T^8 \cdot S_{tp} + U_{tp},$$

where $S_{tp}$ is the eight-bit intermediate syndrome word at the time tp of the parallel data clock 15, $S_{tp+1}$ is the eight-bit intermediate syndrome word in the next time period of the parallel data clock 15, $U_{tp}$ is the eight-bit input vector to the means 10 for generating the syndrome word 20, and $T^8$ has been presented previously and corresponds with the transformation matrix of the parallel divider circuit that relates the intermediate syndrome words between two consecutives cycles of the parallel data clock, and which can be expressed in logic functions as follows:

$$(S_8)_{t+1} = (S_8)_t + (S_7)_t + (S_6)_t + U_8$$

$$(S_7)_{t+1} = (S_7)_t + (S_6)_t + (S_5)_t + U_7$$

$$(S_6)_{t+1} = (S_6)_t + (S_5)_t + (S_4)_t + U_6$$

$$(S_5)_{t+1} = (S_5)_t + (S_4)_t + (S_3)_t + U_5$$

$$(S_4)_{t+1} = (S_8)_t + (S_4)_t + (S_3)_t + (S_2)_t + U_4$$

$$(S_3)_{t+1} = (S_7)_t + (S_3)_t + (S_2)_t + (S_1)_t + U_3$$

$$(S_2)_{t+1} = (S_7)_t + (S_2)_t + (S_1)_t + U_2$$

$$(S_1)_{t+1} = (S_8)_t + (S_7)_t + (S_1)_t + U_1$$

where the + symbol indicates a modulo-2 sum.

Figure 3:
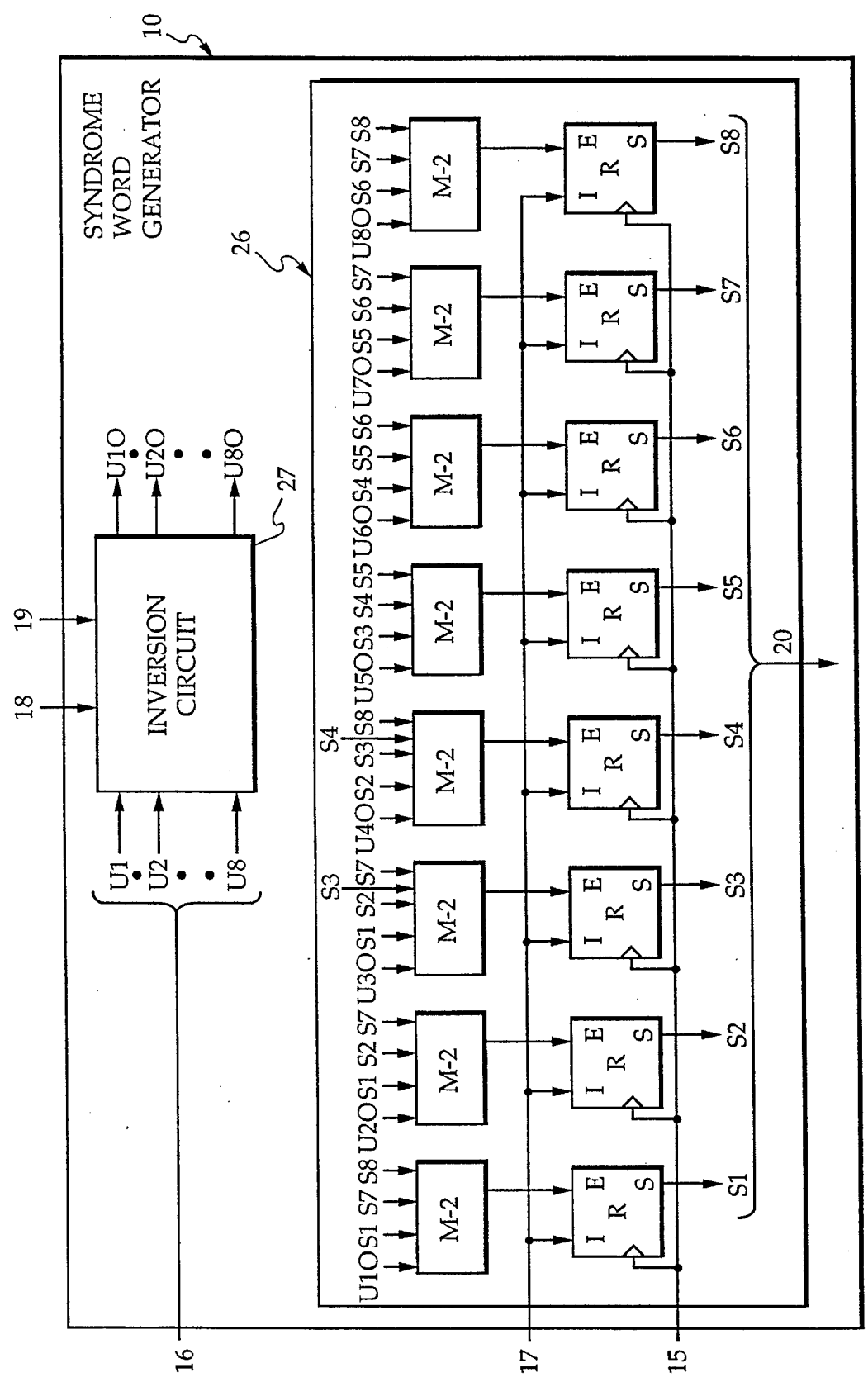
FIG. 3 shows a preferred implementation of the means to generate the syndrome word, in accordance with the invention.

A preferred physical implementation is shown in FIG. 3, under the reference 26.

After the input of the five bytes in an ATM cell header to means 26, the syndrome word 20 indicates:

| syndrome | | | | | | | | erroneous bit |
|---|---|---|---|---|---|---|---|---|
| S1 | S2 | S3 | S4 | S5 | S6 | S7 | S8 | |
| 0 | 0 | 0 | 0 | 0 | 0 | 0 | 0 | error free header |
| 1 | 0 | 0 | 0 | 0 | 0 | 0 | 0 | bit 1 |
| 0 | 1 | 0 | 0 | 0 | 0 | 0 | 0 | bit 2 |
| 0 | 0 | 1 | 0 | 0 | 0 | 0 | 0 | bit 3 |
| 0 | 0 | 0 | 1 | 0 | 0 | 0 | 0 | bit 4 |
| 0 | 0 | 0 | 0 | 1 | 0 | 0 | 0 | bit 5 |
| 0 | 0 | 0 | 0 | 0 | 1 | 0 | 0 | bit 6 |
| 0 | 0 | 0 | 0 | 0 | 0 | 1 | 0 | bit 7 |
| 0 | 0 | 0 | 0 | 0 | 0 | 0 | 1 | bit 8 |
| 1 | 1 | 1 | 0 | 0 | 0 | 0 | 0 | bit 9 |
| 0 | 1 | 1 | 1 | 0 | 0 | 0 | 0 | bit 10 |
| 0 | 0 | 1 | 1 | 1 | 0 | 0 | 0 | bit 11 |
| 0 | 0 | 0 | 1 | 1 | 1 | 0 | 0 | bit 12 |
| 0 | 0 | 0 | 0 | 1 | 1 | 1 | 0 | bit 13 |
| 0 | 0 | 0 | 0 | 0 | 1 | 1 | 1 | bit 14 |

| syndrome | | | | | | | | erroneous bit |
|---|---|---|---|---|---|---|---|---|
| 1 | 1 | 1 | 0 | 0 | 0 | 1 | 1 | bit 15 |
| 1 | 0 | 0 | 1 | 0 | 0 | 0 | 1 | bit 16 |
| 1 | 0 | 1 | 0 | 1 | 0 | 0 | 0 | bit 17 |
| 0 | 1 | 0 | 1 | 0 | 1 | 0 | 0 | bit 18 |
| 0 | 0 | 1 | 0 | 1 | 0 | 1 | 0 | bit 19 |
| 0 | 0 | 0 | 1 | 0 | 1 | 0 | 1 | bit 20 |
| 1 | 1 | 1 | 0 | 1 | 0 | 1 | 0 | bit 21 |
| 0 | 1 | 1 | 1 | 0 | 1 | 0 | 1 | bit 22 |
| 1 | 1 | 0 | 1 | 1 | 0 | 1 | 0 | bit 23 |
| 0 | 1 | 1 | 0 | 1 | 1 | 0 | 1 | bit 24 |
| 1 | 1 | 0 | 1 | 0 | 1 | 1 | 0 | bit 25 |
| 0 | 1 | 1 | 0 | 1 | 0 | 1 | 1 | bit 26 |
| 1 | 1 | 0 | 1 | 0 | 1 | 0 | 1 | bit 27 |
| 1 | 0 | 0 | 0 | 1 | 0 | 1 | 0 | bit 28 |
| 0 | 1 | 0 | 0 | 0 | 1 | 0 | 1 | bit 29 |
| 1 | 1 | 0 | 0 | 0 | 0 | 1 | 0 | bit 30 |
| 0 | 1 | 1 | 0 | 0 | 0 | 0 | 1 | bit 31 |
| 1 | 1 | 0 | 1 | 0 | 0 | 0 | 0 | bit 32 |
| 0 | 1 | 1 | 0 | 1 | 0 | 0 | 0 | bit 33 |
| 0 | 0 | 1 | 1 | 0 | 1 | 0 | 0 | bit 34 |
| 0 | 0 | 0 | 1 | 1 | 0 | 1 | 0 | bit 35 |
| 0 | 0 | 0 | 0 | 1 | 1 | 0 | 1 | bit 36 |
| 1 | 1 | 1 | 0 | 0 | 1 | 1 | 0 | bit 37 |
| 0 | 1 | 1 | 1 | 0 | 0 | 1 | 1 | bit 38 |
| 1 | 1 | 0 | 1 | 1 | 0 | 0 | 1 | bit 39 |
| 1 | 0 | 0 | 0 | 1 | 1 | 0 | 0 | bit 40 |
| - | any other code | | | | | | | more than one erroneous bit |

In addition, in FIG. 2, a delay circuit 11 is shown, the purpose of which is to delay the ATM cell until the syndrome word 20 is available, in this case five cycles of the parallel data clock, and which receives the eight-bit parallel data bus 16 and the parallel data clock 15 to obtain a delayed eight-bit parallel data bus 21.

Finally the device shown in FIG. 2 includes error correcting means 12 to correct the ATM cell header according to the previously mentioned table, which receives the delayed eight-bit parallel data bus 21 and the syndrome word 20, and that obtains the corrected ATM cell header, when required, and, optionally, the following three control signals:

no error indication signal 22, corrected error indication signal 23, and more than one error indication signal 24.

It is claimed:

1. A method for detection and correction of errors in asynchronous transfer mode (ATM) cell header signals in which a serial to parallel conversion (2) takes place for n bits in a serial data signal (1), obtaining an n-bit parallel data signal with a clock rate that is n times lower than an input clock rate of the serial data signal (1), said method further comprising the steps of:

generating a syndrome word signal (3) from the n-bit parallel input data signal in an ATM cell header signal in accordance with a functional relation: the output code vector signal $$S_{tp+1} = T^n \cdot S_{tp} + U_{tp},$$

where $T^n$ is an n-th power of a serial transformation matrix signal;

$U_{tp}$ is an n-bit input data vector signal at a time tp;

$S_{tp}$ is the syndrome word signal (3) at the time tp; and $S_{tp+1}$ is the syndrome word signal (3) at a time tp+1; and indicating with the syndrome word signal (3) for a header signal of each ATM header cell signal with the n-bit parallel data signal:

that no error has been detected; or that more than one error has been detected; or an erroneous bit to be corrected when only one error has been detected.

2. A method for detection and correction of errors in ATM cell header signals according to claim 1, wherein the method further comprises the steps of delaying the ATM cell header signal with the n-bit parallel data signal (4) until the syndrome word signal (3) is generated and providing a delayed n-bit parallel data signal, performing an error correction process (5) on the delayed n-bit parallel data signal in accordance with the syndrome word signal (3) generated, and generating a corrected ATM cell header signal (6), when required, in accordance with the syndrome word signal (3).

3. A method for detection and correction of errors in ATM cell header signals according to claim 1, wherein the method further comprises the steps of providing an individual indication signal (7) for external use showing that no error has been detected, that more than one error has been detected, or that one error has been corrected.

4. A device for detection and correction of errors in asynchronous transfer mode (ATM) cell header signals, comprising:

a serial to parallel converter (9), responsive to a serial data signal (14), for providing an n-bit parallel data signal;

a frequency divider (8), responsive to a serial data clock signal (13), for providing an n-bit parallel data clock signal (15); and syndrome word generator means (10), responsive to the n-bit parallel data signal (16), further responsive to an initialization control signal (17) to set the initial values of the syndrome word generator means (10), and further responsive to the parallel data clock signal (15) to set the clock rate signal of said syndrome word generator means (10), for providing a syndrome word signal (20) in accordance with a functional relation: the output code vector signal $$S_{tp+1} = T^n \cdot S_{tp} + U_{tp},$$

where $T^n$ is an n-th power of a serial transformation matrix signal;

$U_{tp}$ is an n-bit input data vector signal at a time tp;

$S_{tp}$ is the syndrome word signal (3) at the time tp; and $S_{tp+1}$ is the syndrome word signal (3) at a time tp+1; and wherein the syndrome word signal (3) indicates for a header signal of each ATM header cell signal with the n-bit parallel data signal:

that no error has been detected;

that more than one error has been detected; and an erroneous bit to be corrected when only one error has been detected.

5. A device according to claim 4, wherein the syndrome word generator means (10) being responsive to an ATM cell header indication signal (18) that indicates the bits from which the syndrome word signal (20) has to be obtained.

6. A device according to claim 4, wherein said device further comprises:

a delay circuit (11), responsive to the n-bit parallel data signal (16) and the parallel data clock signal (15), for generating a delayed n-bit parallel data signal (21) delayed by the time necessary to obtain the syndrome word signal (20) of the ATM cell header signal; and error correction means (12), responsive to the syndrome word signal (20) and the delayed n-bit parallel data signal (21), for providing an ATM cell header signal (25) in accordance with the indications contained in the syndrome word signal (20), as well as a no error detection signal (22) showing that no error has been detected, a multiple error detection signal (24) showing that more than one error has been detected, or a one error correction signal (23) indicating that one error has been corrected.

7. A device according to claim 5, wherein the syndrome word generation means (10) is also responsive to an indication signal of the last eight bits in the ATM cell header signal (19) for an inversion of those bits that were previously inverted in the transmission part.

8. A device according to claim 5, wherein the syndrome word generation means (10) generates the syndrome word signal (20), when the number of bits is n=8, based on the following logic functions:

$$(S_8)_{t+1}=(S_8)_t+(S_7)_t+(S_6)_t+U_8,$$

$$(S_7)_{t+1}=(S_7)_t+(S_6)_t+(S_5)_t+U_7,$$

$$(S_6)_{t+1}=(S_6)_t+(S_5)_t+(S_4)_t+U_6,$$

$$(S_5)_{t+1}=(S_5)_t+(S_4)_t+(S_3)_t+U_5,$$

$$(S_4)_{t+1}=(S_8)_t+(S_4)_t+(S_3)_t+(S_2)_t+U_4,$$

$$(S_3)_{t+1}=(S_7)_t+(S_3)_t+(S_2)_t+(S_1)_t+U_3,$$

$$(S_2)_{t+1}=(S_7)_t+(S_2)_t+(S_1)_tU_2,$$

and $$(S_1)_{t+1}=(S_8)_t+(S_7)_t+(S_1)_t+U_1,$$

in modulo-2 addition, and where:

- $(S_i)_t$ is the i-th bit of the syndrome word signal (20) at the time t of the intermediate calculation,
- $(S_i)_{t+1}$ is the i-th bit of the syndrome word signal (20) in the following period t+1 of the intermediate calculation, and
- $U_i$ is the i-th bit of the n-bit parallel data signal (16) that is applied to the syndrome word generation means (10) to generate the syndrome word signal (20).

9. A device according to claim 4, wherein the syndrome word signal (20) contains information about a respective header of each ATM cell, including either no error has been detected, more than one error has been detected, or an erroneous bit is to be corrected when only one error has been detected.

* * * * *

UNITED STATES PATENT AND TRADEMARK OFFICE
CERTIFICATE OF CORRECTION

PATENT NO. : 5,570,377
DATED : October 29, 1996
INVENTOR(S) : Merino Gonzalez et al.

It is certified that error appears in the above-indentified patent and that said Letters Patent is hereby corrected as shown below:

On the title page, item [75], Inventors, insert the following:

--Jose L. MERINO GONZALEZ, Parque de las Castillas-Arroyo de Valdemoro; Carmen Maria LEQUERICA CABELLO, deceased, late of Santander, both of Spain, by Manuel Lequerica Toda, and Maria Antonia Cabello Martinez, Santander, both of Spain heirs--

Signed and Sealed this

Twenty-ninth Day of April, 1997

Attest:

BRUCE LEHMAN

Attesting Officer

Commissioner of Patents and Trademarks